United States Patent [19]

Eguchi

[11] Patent Number: 5,472,601

[45] Date of Patent: Dec. 5, 1995

[54] HOLLOW FIBER FILTER

[75] Inventor: Tamiyuki Eguchi, Kobe, Japan

[73] Assignee: Kanegafuchi Kagaku Kogyo Kabushiki Kaisha, Osaka, Japan

[21] Appl. No.: 322,570

[22] Filed: Oct. 13, 1994

[51] Int. Cl.6 ................................................ B01D 63/00
[52] U.S. Cl. .................. 210/321.8; 210/321.79; 210/321.88; 210/500.23; 210/450; 210/455
[58] Field of Search .................... 210/321.78, 321.79, 210/321.8, 321.87, 321.88, 321.89, 450, 455, 477, 500.23; 96/8, 10

[56] References Cited

U.S. PATENT DOCUMENTS

| 5,053,130 | 10/1991 | Raff et al. | 210/321.88 |
| 5,192,499 | 3/1993 | Sakai et al. | 210/450 |
| 5,236,586 | 8/1993 | Antoni et al. | 210/321.8 |

FOREIGN PATENT DOCUMENTS

| 199518 | 10/1986 | European Pat. Off. . |
| 370859 | 5/1990 | European Pat. Off. . |
| 408000 | 1/1991 | European Pat. Off. . |
| 525317 | 3/1993 | European Pat. Off. . |
| 538673 | 10/1992 | Germany . |
| 63-0056192 | 3/1988 | Japan . |
| 1231905 | 9/1989 | Japan . |
| 5057154 | 9/1991 | Japan . |
| 60-55039 | 5/1992 | Japan . |
| 60-23243 | 7/1992 | Japan . |

Primary Examiner—Ana M. Fortuna
Attorney, Agent, or Firm—Armstrong, Westerman, Hattori, McLeland & Naughton

[57] ABSTRACT

A hollow fiber type filter having a simple structure and also having an excellent heat resistance which can withstand a rapid temperature change due to high temperature generated in, for example, a steam sterilization is disclosed. The hollow fiber type filter comprises a case and a plurality of hollow fiber type filter membranes which are bundled and fixed with a potting material in the case, wherein a stop ring designed such that a thickness thereof increases inwardly is provided on an inner surface of the case into which the potting material is poured, and air release portions which penetrate the stop ring in the direction of the thickness of the stop ring is formed at an appropriate portion of the stop ring.

12 Claims, 6 Drawing Sheets

HOLLOW FIBER FILTER

FIELD OF THE INVENTION

The present invention relates to a hollow fiber type filter used in a reverse osmosis, an ultrafiltration, a microfiltration, or the like and more particularly, it relates to a hollow fiber type filter which can withstand a large temperature change generated in a steam sterilization, or the like.

BACKGROUND OF THE INVENTION

A hollow fiber type membrane filtration device used in a reverse osmosis, an ultrafiltration, a microfiltration, or the like is already utilized in various fields. With the expansion of the uses, a hollow fiber type filter which can withstand a rapid temperature change has been required in a broad range. Such a hollow fiber type filter has a structure such that many hollow fiber type membrane filters which are generally bundled in an approximately columnar shape are bundled and fixed together with a cylindrical case by potting materials such as an epoxy resin, an urethane resin, or the like.

If a fluid having a different temperature is rapidly poured into a filter having such a structure, a rapid temperature distribution occurs in the radius direction of the cylindrical case in the portion of the potting material, and a large internal stress generates in the portion having a large temperature gradient. When the direction of this stress is in a tensile direction, it may cause a split between the potting material and the case in some occasions. If the split between the potting material and the case occurs, a problem arises such that a liquid leaks from this portion.

The following methods have conventionally been employed in order to prevent the above problem.

(1) Grooves are formed on the inner surface of the case.

(2) An elastic sealing material such as O ring is inserted between the case and the potting material.

(3) Two kinds of the potting materials are used, one being a potting material for imparting a strength, and another being a flexible potting material for preventing the split.

However, the first method has the disadvantages that the potting material cannot completely remove the air in the grooves, and even if the grooves are shaped so as to have a wedge effect, it is not still sufficient to prevent the split. Further, the stress concentrates in the potting materials on the grooves, so that cracks occur in the potting material per se.

The second method has the disadvantage that the sealing material such as O ring is embedded in the potting material, and as a result, the sealing effect cannot sufficiently be exhibited.

The third method has the disadvantage that the casting must be conducted twice, and this is not economically preferred.

Thus, various counterplans have been made so as not to occur the split between the potting material and the case for the hollow fibers when a rapid temperature change is imparted to the hollow fiber type filter, but no satisfactory method has yet been obtained at the present. Since the more the modulus of elasticity of the potting material and the case increases, the more the internal stress generated by the temperature gradient increases, the splitting is liable to occur when materials having a large modulus of elasticity are used. Further, the splitting is also liable to occur where an adhesive strength between the case and the potting material is small. Therefore, in order to prevent the splitting, it is preferred that the case and the potting material have a small modulus of elasticity and are flexible, and that the mutual adhesive strength is large. On the other hand, it is also required for the case and the potting material to have a heat resistance and a pressure resistance. Therefore, a hollow fiber filter which can withstand a large temperature change cannot be obtained unless those antipodal characteristics are simultaneously satisfied.

The tensile stress f (kg/cm$^2$) generated in a potting material when the potting material receives a pressure P (kg/cm$^2$) is as follows (cf. Oguri et al., Kikai Sekkeizuhyo Binran, Kyoritsu Shuppan K. K., 1985).

$$f = 0.75 \times P \times (r^2/t^2) \tag{1}$$

wherein r is a radius of a plane disc-type potting material (cm), t is a thickness thereof (cm).

For example, assuming that a hollow fiber type filter having substantially the same size as the commercially available cartridge filter having r=35 mm and t=10 mm receives a pressure of 2 kg/cm$^2$, the maximum tensile stress of 20 kg/cm$^2$ calculated from the above equation (1) generates in the potting material. Since this pressure corresponds to a heating steam at about 120° C., it is required for the potting material in this filter to have a permissible stress of at least about 25 kg/cm$^2$ in the temperature range of from room temperature to about 120° C.

Further, when the above-described filter at 20° C. is rapidly heated with a steam at 120° C. from the outside of the case, a temperature gradient of about 100° C. occurs in the interface between the case and the potting material. In this case, if a coefficient of thermal expansion of the case is represented by $\alpha$, and a modulus of elasticity of the potting material is represented by e (kg/cm$^2$), a stress $\sigma$ (kg/cm$^2$) represented by the following equation generates in the direction of the radius of the potting material at the interface between the potting material and the case by the thermal expansion of the case.

$$\sigma = 100 \alpha \times e \tag{2}$$

In general, a plastic material is used for the case, and it is considered that the coefficient of thermal expansion $\alpha$ is about $10^{-4}$, and the modulus of elasticity e of the potting material in the vicinity of room temperature, which comprises an epoxy resin or an urethane resin, each having a heat resistant property, is 5,000 to 10,000 kg/cm$^2$. Therefore, the stress $\sigma$ generated at the interface is 50 to 100 kg/cm$^2$. In other words, the adhesive strength between the potting material and the case must be 50 to 100 kg/cm$^2$ or more in order to prevent occurrence of the splitting at the interface, but it is not practically easy to achieve such a large adhesive strength with the potting material only.

Further, where the above-described temperature gradient is imparted, a thermal expansion generates in single % order such as in 2% or 5% calculated from the equation(2). And the potting material itself is broken unless the potting material can follow up the elongation. Therefore, the maximum elongation of the potting material must be at lease 10%.

SUMMARY OF THE INVENTION

Under the above circumstances, various investigations have been made to overcome the disadvantages involved in the conventional hollow fiber type filter.

Accordingly, an object of the present invention is to provide a hollow fiber type filter having a simple structure and also a heat resistance which can withstand a rapid temperature change due to high temperature generated in, for example, a steam sterilization. This object can be achieved by the following hollow fiber type filter.

The hollow fiber type filter according to the present invention comprises a case and a plurality of hollow fiber type membrane filters which are bundled and fixed by a potting material in the case, wherein a stop ring designed such that a thickness thereof increase inwardly toward an inner edge of the stop ring is provided on the inner surface of the case, into which the potting material is injected, and air release portions are formed at an appropriate portion of the stop ring so as to penetrate the stop ring in the direction of the thickness of the stop ring.

It is preferred that the stop ring has a cross-section of a tapered form on the upper and lower portions thereof.

Further, it is preferred that the air release portions are formed in the stop ring such that part of a case-side portion or an inner side portion of the stop ring remains. The effect obtained from this is described later.

It is still further preferred that the potting material used has a heat resistance at 120° C. or more, and maximum tensile permissible stress of 25 kg/cm$^2$ or more and a maximum elongation of 10% or more in a temperature range of from room temperature to 120 ° C.

According to the hollow fiber type filter of the present invention, when the potting material is injected into the case having the stop ring provided on the inner surface of the case and designed such that the thickness of the stop ring increases inwardly, the stop ring is embedded in the potting material while discharging gas bubbles generated through the air release portions.

In case where stop ring has a cross-section of a tapered form on the upper and lower portions thereof the stop ring is embedded in the potting material.

In case where the air release portion is formed in the stop ring while remaining part of a case-side portion or an inner side portion of the stop ring, the potting material is filled in the air release portion.

And in case where the potting material has a heat resistance at 120° C. or more, and maximum tensile permissible stress of 25 kg/cm$^2$ or more and a maximum elongation of 10% or more in a temperature range of from room temperature to 120° C., the potting material is injected into the case.

DETAILED DESCRIPTION OF THE INVENTION

The embodiment of the present invention is explained in detail below by referring to the accompanying drawings.

Figure 1:
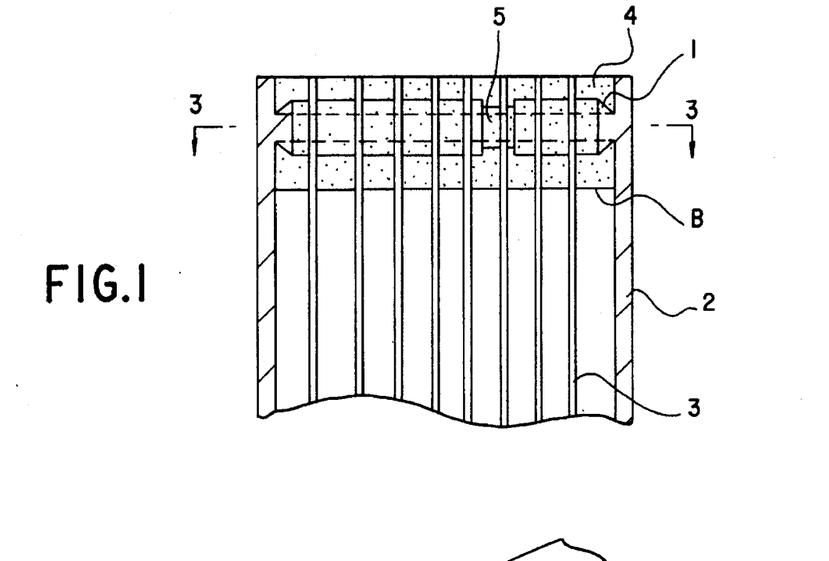
FIG. 1 is a cross-sectional view showing a main portion of the hollow fiber type filter according to the first embodiment of the present invention.

FIG. 1 is a cross-sectional view of the hollow fiber type filter according to the first embodiment of the present invention, in which only the potting portion is shown. In FIG. 1 numerals 1, 2, 8 and 4 denote a stop ring, a case for accommodating hollow fiber type membrane filters, a hollow fiber type filter, and potting material, respectively. The potting material 4 is filled only in the portion upper from a line B. Numeral 5 is one of air release portions provided in part of the stop ring 1. The hollow type filters are folded in a loop shape (or a U shape) to arrange all ends of the filters 3 in parallel, and are bundled and fixed in the case 2 by the potting material 4 such that all the ends have openings. For example, in the case of filtering water, water is introduced into the case 2 from inlets ( not shown) perforated in the case 2, water is filtered from the outside of the hollow fiber type filter 3 to the inside thereof, and the filtered water is discharged from the ends (openings) through the hollow fiber type filter 3.

Two or more stop rings 1 may be formed, but a sufficient effect is generally obtained by one stop ring. The width in the up and down direction of the stop ring 1 is such that the length at the potting material-contacting side (a tip side of the stop ring) is larger than the length at the case-contacting side (a base side of the stop ring), i.e., a tapered form in the upper and lower edges. Thus, the stop ring has a structure having a so-called wedge effect. The angle of the wedge relative to the horizontal plane (the angle α in FIG. 2) is preferably from 15° to 60°, and more preferably from 30° to 45°.

The stop ring 1 is not limited to the above-described shape, but the stop rings having various shapes can be used so long as the shape is designed such that the thickness increases toward the tip (i.e., inwardly).

Figure 2:
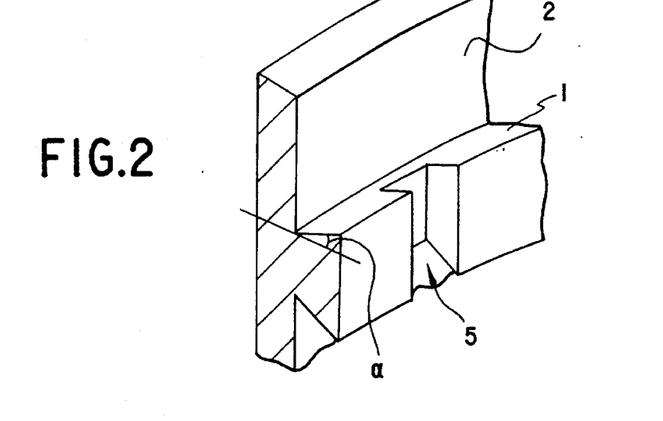
FIG. 2 is a perspective view showing an air release portion according to the first embodiment of the present invention.
Figure 3:
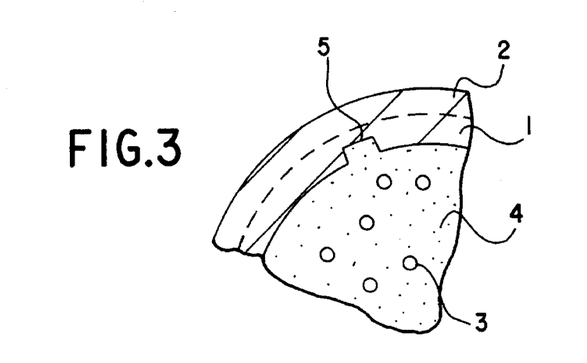
FIG. 3 is a cross-sectional view taken along A—A in FIG. 1.
Figure 4:
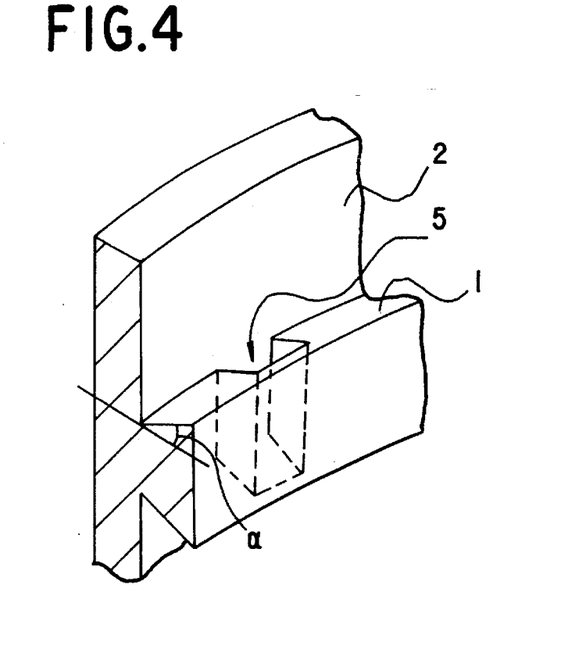
FIG. 4 is a perspective view showing one example of an air release portion according to the second embodiment of the present invention.
Figure 5:
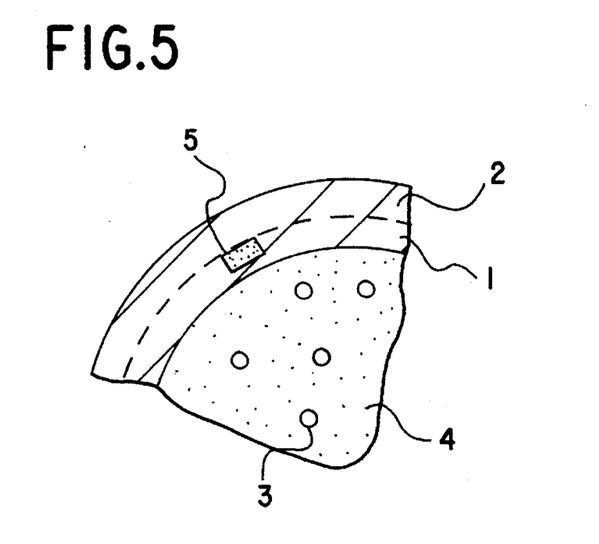
FIG. 5 is a cross-sectional view showing another example of an air release portion according to the second embodiment of the present invention.

FIG. 2 is a perspective view showing an air release portion (5) according to the first embodiment of the present invention, and FIG. 3 is a cross-sectional view taken along the line A—A in FIG. 1. The air release portion 5 acts to prevent air bubbles from remaining in injecting the potting material 4. It is required for the air release portions to be formed such that the stop ring 1 is not entirely cut off but is cut off until a necessary depth between the inner side and the outer side of the stop ring in order to further increase the effect for preventing separation of the potting material 4 from the case 2. The air release portion 5 according to the first embodiment of the present invention shown in FIGS. 2 and 3, is formed by cutting off the tip side of the stop ring 1 in a rectangular shape in cross-section. The air release portion 5 shown in FIGS. 4 and 5 according to the second embodiment of the present invention is formed by cutting off the base side of the stop ring 1 in a rectangular shape in cross-section. In either case, if the width in the circumferential direction of the air release portion becomes large, the potting material 4 and the stop ring 1 or the case 2 are liable to separate, and therefore it is necessary to have a width of 10 mm or less.

Even if either one surface of the upper and lower surfaces of the stop ring 1 having a wedge shape is embedded in the potting material, the wedge effect of the stop ring 1 can be obtained, but it is preferred that the entire stop ring 1 is embedded in the potting material 4 as shown in FIG. 1, thereby exhibiting the wedge effect at both the upper and lower sides. A supplemental effect for increasing the adhesive strength of the potting material 4 is not substantially effected by the thickness in the radius direction of the stop ring 1, but in order to exhibit the effect that the bundle of hollow fibers does not shift to one side in the case, the thickness in the radius direction of the stop ring 1 is preferably from 1 to 7 mm, and more preferably from 2 to 5 mm.

Another embodiment of the air release portion 5 is explained below.

Figure 6A:
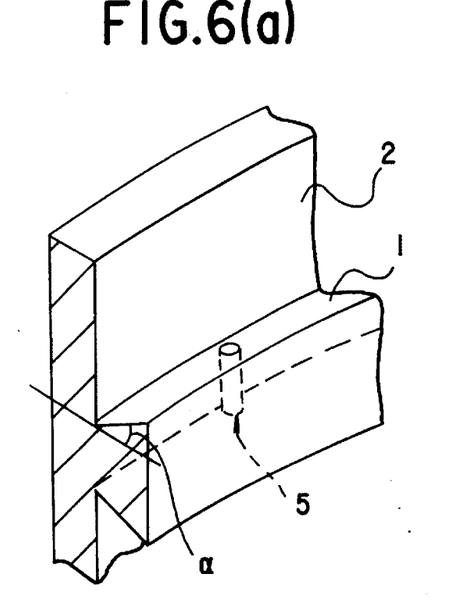
FIG. 6(a) is a perspective view showing one example of an air release portion according to the third embodiment of the present invention.

The air release portion 5 according to the third embodiment of the present invention shown in FIG. 6(a) is formed by penetrating in the direction of the thickness of the stop ring 1 with a substantially circular cross-section shape at the base side of the stop ring 1. This embodiment is the best mode of the present invention. In more detail, the potting material is filled in the circular air release portion 5, whereby the effect for preventing falling-off is further enhanced.

Figure 6B:
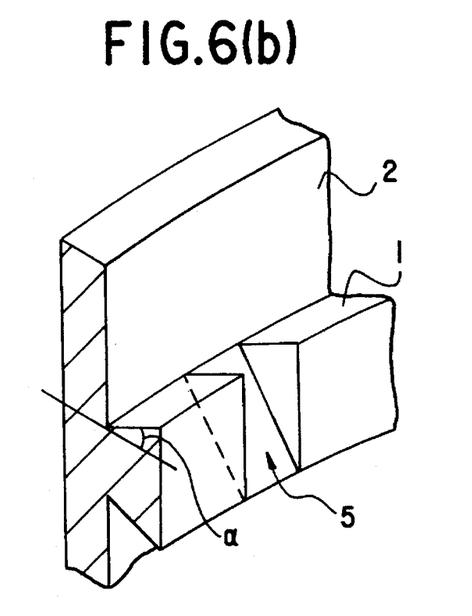
FIG. 6(b) is a perspective view showing another example of an air release portion according to the fourth embodiment of the present invention.

The air release portion 5 according to the fourth embodiment of the present invention shown in FIG. 6(b) is formed by cutting stop ring 1 from the upper surface to the lower surface such that the entire surface in a rectangular shape is cut off at the upper surface, and the thickness of the portion cut is gradually decreased toward the lower surface, so that the portion cut ultimately meets the lower edge of the stop ring 1 (i.e., a gradient cutting).

A material generally used for the case 2 and the stop ring 1 is a plastic material such as a polypropylene, a polycarbonate, an ABS (acrylonitrile-butadiene-styrene) resin, a polysulfone, or the like. Therefore, the case and the stop ring can be formed as an integral molding, or formed by adhering those with an ultrasonic wave welding or the like to form an integral body.

The hollow fiber type filter 3 can be of any type so long as it withstands high temperature such as a steam sterilization. Materials for such a hollow fiber are a polysulfone, polyether sulfone, a polypropylene, a fluorine type polymer such as a polyvinylidene fluoride or a polytetrafluoroethylene, a cellulose, a cellulose derivative such as a cellulose ester, a heat resistant polyamide, a polyimide, a heat resistant polyester, and the like.

As described above, the potting material 4 must have the tensile permissible stress of about 25 kg/cm$^2$ or more and the maximum elongation of about 10% or more in the temperature range of from room temperature to 120° C. The filter of the present invention is produced by bundling and fixing the hollow fiber 8 and the case 2 with the potting material 4 by a so-called centrifugal casting method. A two-part type thermosetting resin is generally used as the potting material 4. Among those thermosetting resins, resins which are satisfied with the above-described characteristics and are preferably used in the present invention are an epoxy resin and an urethane resin. However, in addition to the requirements that the potting material 4 is simultaneously satisfied with the heat resistance of 120° C. or more, the tensile strength of 25 kg/cm$^2$ or more, and the elongation of 10% or more as described above, it is important that with the elements in the potting material used in the present invention that the amount of harmful substances eluted is slight, a cut powder does not generate when the potting portion is cut to form openings of the hollow fibers after curing, and the cut surface is smooth. Therefore, the blend composition is limited.

Figure 8:
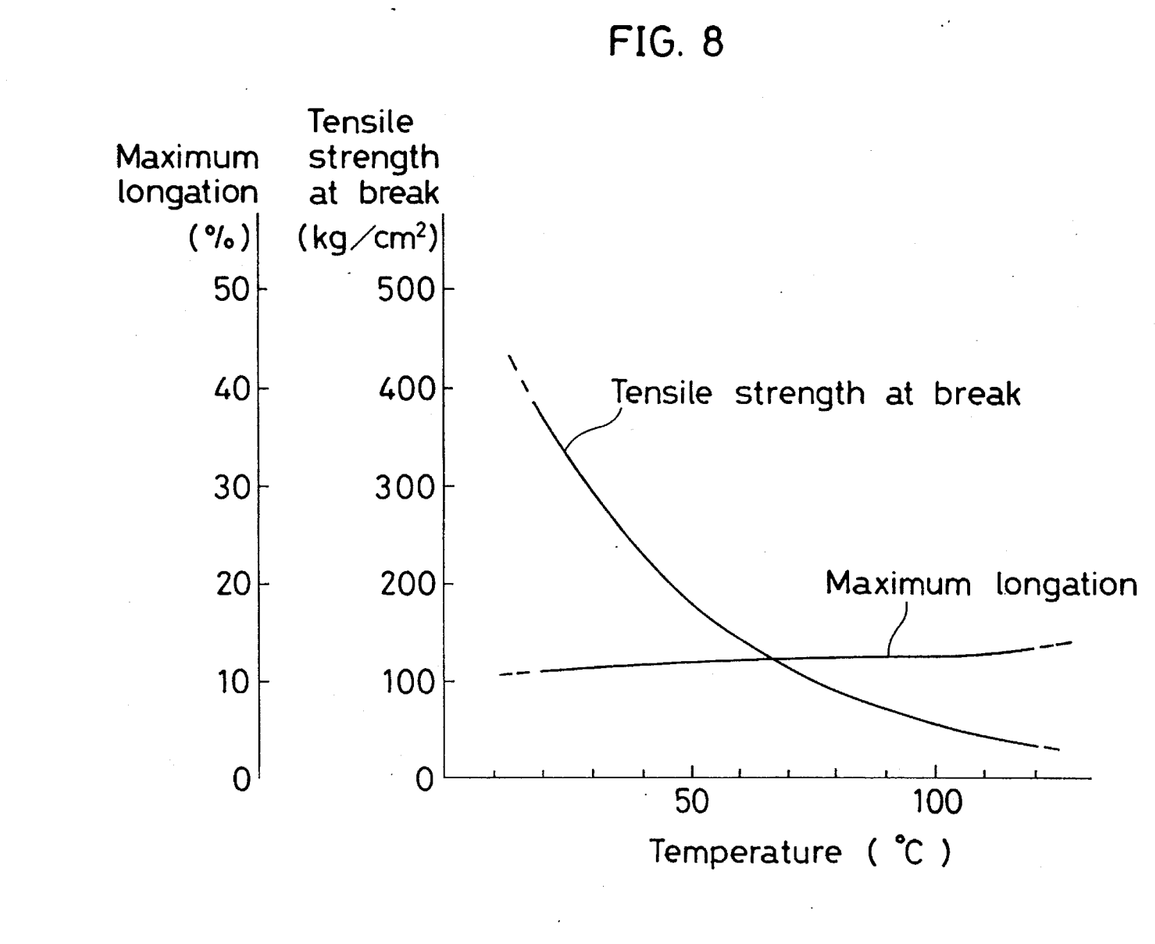
FIG. 8 is a graph showing relationships between a tensile strength at break and temperature, and between a maximum elongation and temperature, in an epoxy resin.
Figure 9:
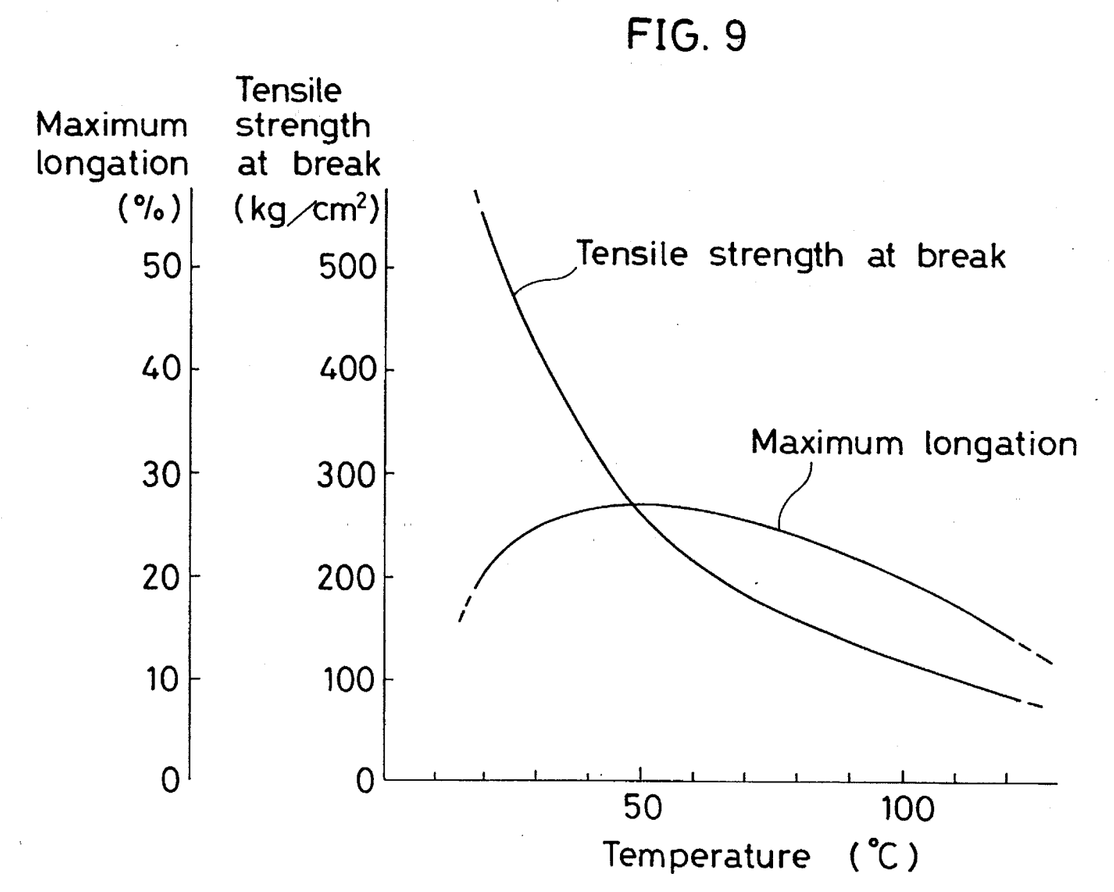
FIG. 9 is a graph showing relationships between a tensile strength at break and temperature, and between a maximum elongation and temperature, in an urethane resin.

It is preferred that a mixed solution of a hisphenol A type resin or a heat resistant phenol-novolak type resin, and an aliphatic dimer acid which imparts a flexibility is used as the base component of the epoxy resin. The preferred crating agent is mixed solution of an alicyclic amine which imparts a heat resistance and a polyamide or a flexibilizer such as an amino-terminated low molecular weight elastomer. The graph shown in FIG. 8 shows the tensile strength at break and the maximum elongation of the epoxy resin comprising the above blend as one example.

Where an urethane resin is used as the potting material, a blend of an aliphatic polyol or an aromatic ring-containing polyol and a polyol adduct with 4,4'-diphenylmethane diisocyanate for imparting a heat resistance is preferably used. The graph in FIG. 9 shows the tensile strength at break and the maximum elongation of the urethane resin comprising the above blend as one example. By this blend composition, the urethane resin can be satisfied with the above-described requirements even if the resin is not particularly post-cured at a high temperature.

A potting method of bundling and fixing a plurality of the hollow fiber type filter 3 with the potting material 4 in the case 2 is explained below.

Figure 7:
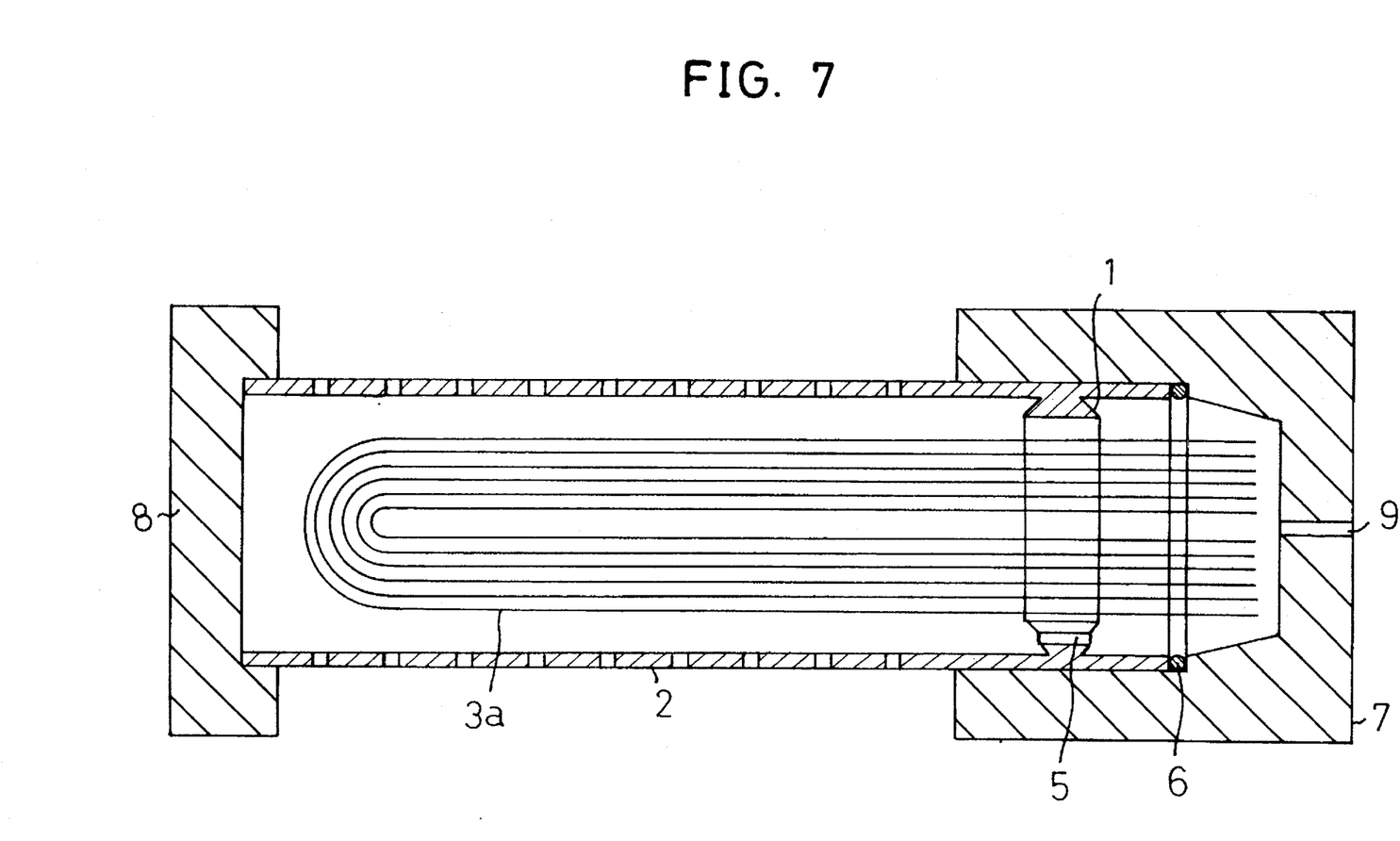
FIG. 7 is a cross-sectional view explaining a potting method.

As shown in FIG. 7, an edge portion of the case 2 having provided in the inner surface thereof the stop ring I and which accommodates a plurality of the hollow fiber 3a in which each tip thereof is sealed so as not to allow the potting material 4 to enter into the hollow fiber is inserted into a mold 7 together with a gasket 6, and the base side portion of the case 2 is fixed with a case holder 8. The assemble is rotated, and the potting material is introduced into the case 2 from an inlet 9 of the mold 7 by a centrifugal force until the entire stop ring 1 is embedded, while discharging gas bubbles through the air release portion 5. After curing the potting material 4, the entire case 2 is taken out of the mold 7, and the potting material 4 is cut at the edge to expose openings of the hollow fiber 3a. Although not particularly shown, a header having an inlet and an outlet for a fluid is connected to both edge portions of the case 2 by, for example, an ultrasonic wave welding, if required and necessary.

The hollow fiber type filter according to the present invention is explained in more detail by reference to the following examples, Comparative Examples and Reference Examples, but it should be understood that tile invention is not constructed as being limited to the Examples.

A cold water-hot water repeated dipping test used herein is a test that tile hollow fiber type filter is alternately dipped in water at about 15° C. and hot water at 95° to 100° C. repeatedly for each 20 to 30 minutes to observe occurrence of separation in the potting portion.

An autoclave repetition test used herein is a test that the above cold water-hot water repeated dipping test is conducted except that hot water at 121° C. is used in place of hot water at 95° to 100° C. to observe the result.

The result that the effect of the present invention was exhibited means the case that separation did not occur even

COMPARATIVE EXAMPLE 1

One end of a polycarbonate-made simple cylinder having an inner diameter of 61 mm and a wall thickness of 3 mm was filled with the epoxy resin having the characteristics shown in the graph of FIG. 8 at a depth of 15 mm. When this sample was subjected to the cold water-hot water repeated dipping test, the epoxy resin and the inner wall of the cylinder were separated at only one dipping in hot water.

COMPARATIVE EXAMPLE 2

The sample was prepared in the same manner as in Comparative Example 1 except that the urethane resin having the characteristics shown in the graph of FIG. 9 was used in place of the epoxy resin. As a result of the autoclave repetition test, the splitting occurred at the 4th time.

COMPARATIVE EXAMPLE 3

A stop ring having a thickness in a radius direction of 3 mm, a length in an axial direction of 10 mm and angles at both edges of 45° and which does not have an air release portion was adhered to the inner surface of the cylinder used in Comparative Example 1 such that one end of the stop ring was located at a position of 2 mm inside from the end of the cylinder. The cylinder was filled with the same epoxy resin as used in Comparative Example 1 by a centrifugal casting at a depth of 15 mm so that the stop ring was completely embedded, but a large amount of gas bubbles was remained along the lower wedge portion of the stop ring. As a result that this sample was subjected to the autoclave repetition, the separation occurred in the lower side at the 4th time.

COMPARATIVE EXAMPLE 4

A sample was prepared in tile same manner as in Comparative example 3 except for using a stop ring having formed thereon one air release portion having a width of 5 mm over the entire width in the radius direction of the stop ring. This sample did not almost have gas bubbles remained in the wedge portion. However, as a result of the autoclave repetition test, the stop ring began to separate from the inner surface of the cylinder at the edge of the air release portion at the 4th time, and simultaneously the epoxy resin was separated from inner surface of the cylinder at the air release portion.

REFERENCE EXAMPLE 1

A sample was prepared in the same manner as in Comparative Example 4 except for using the cylinder having a stop ring that two air release portions each having a width of 5 mm in a circumferential direction and a depth of 2 mm (the remaining thickness 1 mm) are formed on the inner surface of the stop ring at the symmetrical positions. This sample was subjected to the cold water-hot water repeated dipping test 10 times and then the autoclave repetition test 12 times. As a result, the separation did not occur.

REFERENCE EXAMPLE 2

A sample was prepared in the same manner as in Reference Example 1 except that two air release portions each having a width of 5 mm in the circumferential direction and a depth of 2 mm are formed on the outer surface of the stop ring at the symmetrical positions. This sample was subjected to the cold water-hot water repeated dipping test 10 times and then the autoclave repetition test 10 times, as a result, the separation did not occur.

REFERENCE EXAMPLE 3

A sample was prepared in the same manner as in Reference Example 1 except that the same urethane resin as used in Comparative Example 2 was used in place of the epoxy resin. This sample was subjected to the cold water-hot water repeated dipping test 10 times and then the autoclave repetition test 10 times, but the separation did not occur.

REFERENCE EXAMPLE 4

A sample was prepared in the same manner as in Reference Example 2 except that the same urethane resin as used in Comparative Example 2 was used in place of the epoxy resin. This sample was subjected to the cold water-hot water repeated dipping test 10 times and then the autoclave repetition test 10 times, but the separation did not occur.

EXAMPLE 1

3,400 strings of a polysulfone-made hollow fiber type filter having an inner diameter of 500 µm and an outer diameter of 800 µm were put into a cylinder, and those fibers were bundled and fixed together with the cylinder with an epoxy resin at a depth of 15 mm in average from the end of the cylinder in the same manner as in Reference Example 1. The potting portion was then cut at the end of the cylinder to expose the openings of the hollow fibers. This sample was subjected to the cold water-hot water repeated dipping test 10 times and then the autoclave repetition test 10 times, but the separation was not observed.

EXAMPLE 2

A sample was prepared in the same manner as in Example 1 except that the same urethane resin as used in Comparative Example 2 was used in place of the epoxy resin. This sample was subjected to the tests in the same manner as in Example 1, but the separation was not observed.

EXAMPLE 3

A sample was prepared in the same manner as in Example 1 except for using the same stop ring as used in Reference Example 2. This sample was subjected to the tests in the same manner as in Example 1, but the separation was not observed.

EXAMPLE 4

A sample was prepared in the same manner as in Example 2 except for using the same stop ring as used in Reference Example 2. This sample was subjected to the tests in the same manner as in Example 1, but the separation was not observed.

REFERENCE EXAMPLE 5

A sample was prepared in the same manner as in Reference Example 1 except that the same air release portions as in Example 1 were formed while remaining 1 mm thickness in the stop ring having a width in the radius direction of 2 mm. This sample was subjected to the cold water-hot water repeated dipping test 10 times and then the autoclave repetition test 10 times, but the separation did not occur.

REFERENCE EXAMPLE 6

A sample was prepared in the same manner as in Reference Example 1 except that the same air release portions as in Example 1 were formed while remaining 1 mm thickness in the stop ring having a width in the radius direction of 4 mm. This sample was subjected to the cold water-hot water repeated dipping test 10 times and the autoclave repetition test 10 times, but the separation did not occur.

EXAMPLE 5

A sample was prepared and then subjected to the test in the same manner as in Example 2 except that the same stop ring as used in Reference Example 5 was used, but the separation was not observed.

EXAMPLE 6

A sample was prepared and then subjected to the test in the same manner as in Example 2 except that the same stop ring as used in Reference Example 6 was used, but the separation was not observed.

According to the hollow fiber type filter of the present invention, by pouring the potting material into a case having provided on the inner wall thereof a stop ring designed such that the thickness thereof increases toward the tip, the stop ring has a function to prevent the falling off, and also the air release portions formed so as to penetrate in the thickness direction of the stop ring at an appropriate position of the stop ring has a function to discharge gas bubbles at pouring the potting material. As a result, it is possible to provide a hollow fiber type filter which can withstand a large temperature change generated in a steam sterilization or the like.

According to the hollow fiber type filter of the present invention, the stop ring having a cross section of a tapered form on the upper and lower portions thereof is embedded in the potting material, and therefore has the effect to prevent the failing-off at the upper and lower portions thereof. Therefore, even if a rapid temperature change is generated, it is possible to prevent the falling-off of the potting material from the case.

Further according to the hollow fiber type filter of the present invention, where the air release portion is formed while remaining the base portion of the stop ring, even if the stop ring made of a material different from the case is adhered, the stop ring is difficult to be separated from the case compared with the embodiment that the air release portion is formed without remaining the base portion of the stop ring.

Further, where the air release portion is formed while remaining the tip portion of the stop ring, the air release portion between the inner surface of the case and the stop ring is filled with the potting material, and as a result, the effect for preventing the failing-off can be further enhanced.

Also according to the hollow fiber type filter of the present invention, the potting material is used, which has a heat resistance of 120° C. or more, the maximum tensile permissible stress of 25 kg/cm$^2$ or more, and the maximum elongation of 10% or more in the temperature range of from room temperature to 120° C. The potting material has a large adhesive strength and excellent heat resistance and pressure resistance, and therefore can withstand a great temperature change generated in a steam sterilization or the like.

What is claimed is:

1. A hollow fiber filter, comprising:

a case;

a plurality of hollow fiber membrane filters which are bundled in said case;

a potted material fixing said hollow fiber membrane filters in the case;

a stop ring having a thickness thereof which increases inwardly toward an inner edge of the stop ring located on an inner surface of the case into which the potting material is poured; and air release portions which penetrate the stop ring in the direction of the thickness thereof as cut off sections disposed at predetermined intervals of said stop ring.

2. The hollow fiber filter of claim 1, wherein said stop ring is integrally molded with said case.

3. The hollow fiber filter according to claim 1, wherein said air release portions have a substantially circular cross section shape.

4. A hollow fiber filter, comprising:

a case;

a plurality of hollow fiber membrane filters which are bundled in said case;

a potting material fixing said hollow fiber membrane filters in the case;

a stop ring having a cross section of a tapered form on an upper and lower edge portion thereof and having a thickness thereof which increases inwardly toward an inner edge of the stop ring located on an inner surface of the case into which the potting material is poured; and air release portions which penetrate the stop ring in the direction of the thickness thereof as partly cut off sections disposed at predetermined intervals of said stop ring.

5. The hollow fiber filter of claim 4, wherein said stop ring is integrally molded with said case.

6. The hollow fiber filter of claim 4, wherein the tapered form involves the upper and lower edge portions being at an angle relative to the horizontal plane between 15 to 60 degrees.

7. The hollow fiber filter of claim 6, wherein said angle is between 30 to 45 degrees.

8. A hollow fiber filter, comprising;

a case;

a plurality of hollow fiber membrane filters which are bundled in said case;

a potting material fixing said hollow fiber membrane filters in the case;

a stop ring having a thickness thereof which increases inwardly toward an inner edge of the stop ring located on an inner surface of the case into which the potting material is poured; and air release portions which penetrate the stop ring in the direction of the thickness thereof as partly cut off sections disposed at predetermined intervals of said stop ring, said stop ring has a width defined between said inner surface of the case and an inner side of said stop ring, said air release portions penetrate only through a portion of said width and said stop ring extends generally continuously around said case.

9. The hollow fiber filter of claim 8, wherein said stop ring is integrally molded with said case.

10. A hollow fiber filter, comprising:

a case;

a plurality of hollow fiber membrane filters which are bundled in said case;

a potting material fixing said hollow fiber membrane filters in the case;

a stop ring having a cross section of a tapered form on an upper and lower edge portion thereof and having a thickness thereof which increases inwardly toward an inner edge of the stop ring located on an inner surface of the case into which the potting material is poured; and air release portions which penetrate the stop ring in the direction of the thickness thereof as partly cut off sections disposed at predetermined intervals of said stop ring, said stop ring has a width defined between said inner surface of the case and an inner side of said stop ring, said air release portions penetrate only through a portion of said width, and said stop ring extends generally continuously around said case.

11. The hollow fiber filter of claim 10, wherein said stop ring is integrally molded with said case.

12. A hollow fiber filter as claimed in any of the claim 1, 2, 3 or 4, wherein the potting material has a heat resistance of 120° C. or more, and a maximum tensile permissible stress of 25 kg/cm$^2$ or more and a maximum elongation of 10% or more in a temperature range of from room temperature to 120° C.

* * * * *